United States Patent
Silvey

[11] 3,779,103
[45] Dec. 18, 1973

[54] CHIPPER CHAIN GRINDER

[76] Inventor: Elmer R. Silvey, Rt. 1, Box 138, Eagle Point, Oreg. 97524

[22] Filed: Sept. 20, 1971

[21] Appl. No.: 181,957

[52] U.S. Cl. .................................. 76/25 A, 76/40
[51] Int. Cl. ............................................ B23d 63/16
[58] Field of Search ............................ 76/25 A, 40

[56] References Cited
UNITED STATES PATENTS

| | | | |
|---|---|---|---|
| 2,217,145 | 10/1940 | Stihl | 76/25 A X |
| 3,071,026 | 1/1963 | De Witt | 76/40 |
| 2,986,048 | 5/1961 | Nielsen | 76/25 A |
| 3,592,085 | 7/1971 | Arneson | 76/25 A |
| 3,349,645 | 10/1967 | Silvey | 76/40 |

Primary Examiner—Leonidas Vlachos
Attorney—Stephen W. Blore et al.

[57] ABSTRACT

A disc shaped grinding wheel having a rounded edge for sharpening chipper saw chain is mounted on the shaft of a motor supported so that the faces of the wheel are inclined downwardly and to one side of a saw chain grinding machine. A vertically disposed saw chain holder positioned below the wheel has a convex upper edge with a slot therein for receiving the drive lugs of a saw chain which is positioned on the holder with the front of the cutter elements directed toward the other side of the machine. An adjustable pawl holds a cutter element in a central uppermost position on the holder for grinding engagement by the lowermost portion of the edge of the wheel. The support for the holder is pivoted about a vertical axis passing through the area of such grinding engagement so that the holder is pivotally movable between two adjustable positions for grinding right and left cutter elements. The wheel normally has its lowermost edge portion in a grinding position between the depth gauge and cutter element of a saw chain cutter link on the saw chain holder. The support for the motor and wheel is pivotally movable about an axis at the rear of the machine, which is below and parallel to the axis of the wheel, so that such edge portion of the wheel can be moved upwardly away from the saw chain to enable forward movement of the saw chain on the holder. In the grinding position of such edge portion of the wheel the axis of the wheel is in a vertical plane through the vertical pivotal axis of the support for the saw chain holder. The support for the motor is also slidably mounted so as to enable movement of the axis of the wheel in such vertical plane in a direction parallel to the faces of the wheel to adjust for wear of the edge of the wheel. The holder for the saw chain is pivoted about a horizontal axis spaced from the vertical pivotal axis of its support and a lever enables tilting of the central portion of the holder upwardly and forwardly of the saw chain thereon to move a cutter element into such grinding engagement with the edge of the wheel. A disc shaped dressing element rotatable about an axis parallel to the axis of the wheel and having an edge complementary to the desired rounded edge of the wheel is supported for movement in a direction parallel to the faces of the wheel and the dressing element to bring the edge of the dressing element into dressing contact with the edge of the wheel.

9 Claims, 9 Drawing Figures

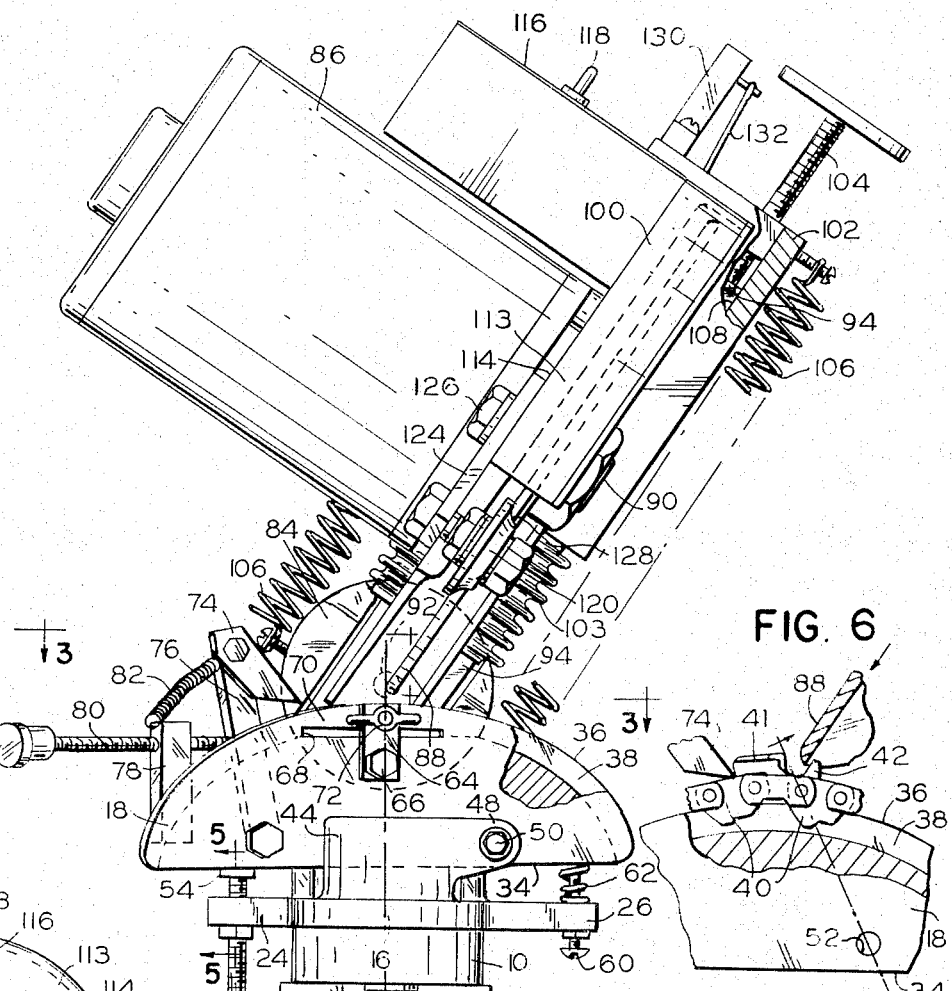
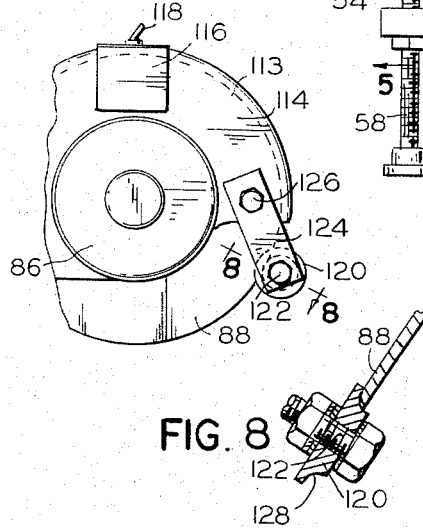
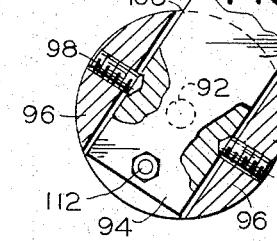

PATENTED DEC 18 1973 3,779,103

ELMER R. SILVEY
INVENTOR

BY
BUCKHORN, BLORE, KLARQUIST & SPARKMAN
ATTORNEYS

CHIPPER CHAIN GRINDER

BACKGROUND OF THE INVENTION

Grinding machines for sharpening chipper saw chain have been of two general types. One type employs a small size grinding element or burr having a diameter equal to that of a round file of the correct size for filing such chipper saw chain. These small diameter burrs wear rapidly and also are not of sufficient size to efficiently carry heat away from the area of grinding engagement with a cutter element so that machines employing such burrs have not proved practical in use.

The other general type of machines for chipper saw chain grinding has employed a disc shaped grinding wheel with a rounded peripheral edge. These machines have, in general, had the grinding wheel supported on a relatively long arm or linkage and most of them have relied upon movement of the relatively heavy support structure for the wheel between alternative positions for sharpening right and left cutter elements. Furthermore these machines have provided a single motion of the grinding wheel along a path generally parallel to the faces of the wheel from a position in which the edge of the wheel is outside the gullet between the depth gauge and cutter element of the saw chain to a position in which the edge of the wheel makes grinding engagement with the cutter element. The inertial effects of the mass of the grinding wheel and its bearing structure as well as that of the supporting arm or linkage, in conjunction with resiliency of such arm or linkage or play therein, has resulted in non uniformity of grinding cutter elements of a saw chain. The depth of cut and the position of the cut of the edge of the grinding wheel has varied with the velocity with which the operator of the machine moved the grinding wheel or upon distorting forces inadvertently exerted on such arm or linkage by the operator. Such machines have not reliably produced the accuracy of grinding required for fast cutting, smooth operating saw chains.

Also the edges of such grinding wheels have required frequent shaping in order to preserve the correct rounding of their edge for proper grinding of the cutter elements. Dressing mechanisms by which a single diamond is caused to move in a curved path in contact with the edge of a rotating disc shaped grinding wheel have been proposed but such devices are expensive and complicated and are slow in operation. Also such devices do not produce an efficient grinding surface on the rounded edge of the grinding wheel.

SUMMARY OF THE INVENTION

The present application discloses a rigid compact supporting structure for a disc shaped grinding wheel having a rounded peripheral edge. The distance between a pivotal mounting for such supporting structure and the cutter element being ground is no greater than the diameter of even a worn grinding wheel and is not much greater than the radius of a new wheel.

During a grinding operation, the wheel is moved parallel to its faces into a definite predetermined grinding position in which an edge portion of the wheel is between the depth gauge and cutter element of a cutter link, but out of contact with the cutter element. The wheel is brought to rest in this grinding position so that the inertial effects or the effects of distorting forces above referred to are dissipated prior to contact of the grinding edge of the wheel with the cutter element. Thereafter a rigid light weight saw chain holder positioned below the wheel is pivotally moved to bring the cutter element of the cutter link into grinding engagement with the edge of the wheel. A stop limits such movement of the saw chain holder so that the grinding operation results in all cutter elements being of the same length.

The wheel is supported so that the faces of the wheel incline downwardly and toward one side of the machine and movement of the wheel into and out of grinding position is parallel to the faces of the wheel. The axis of the wheel, when in grinding position, is above and in a vertical plane extending through the area of grinding engagement with a cutter element. The support for the saw chain holder is below the lowermost edge portion of the wheel and is pivoted about a vertical axis in such a vertical plane so that such vertical axis also extends through the area of grinding engagement. The saw chain holder can be pivotally moved about such vertical axis and locked in two accurately adjusted positions for grinding left and right cutter elements.

The pivotal axis for the support for the grinding wheel enabling movement of the wheel into and out of grinding position is at the rear of the machine and below and parallel to the axis of the wheel. The support for the wheel also includes a sliding adjustment of the wheel parallel to its faces. This adjustment moves the axis of the wheel in the vertical plane above referred to when the wheel is in grinding position to adjust for wear of the edge of the wheel.

the support for the wheel also provides for adjustment of the angle of inclination of the wheel about a horizontal axis intersecting the vertical pivotal axis of the saw chain holder so as to also pass through the area of grinding engagement.

Various other adjustments are also provided and in common with the adjustments above referred to are substantially independent of each other and an accurate and stable machine results.

The machine also includes an improved wheel dressing arrangement involving a disc shaped dressing element having a shaped concave edge complementary to the desired rounded convex edge on the grinding wheel with provision for moving the dressing element parallel to its faces and the faces of the wheel so as to move the edge of the element into contact with the edge of the wheel. Rapid and accurate dressing of the wheel is accomplished.

It is therefore an object of the invention to provide a chipper chain grinding machine having a compact and rigid support structure for supporting a disc shaped grinding wheel and for supporting the saw chain in a manner enabling rapid and accurate grinding of the cutter elements of the chain.

Another object of the invention is to provide an improved wheel dressing arrangement for the grinding wheel of such machine.

BRIEF DESCRIPTION OF THE DRAWINGS

FIG. 1 is a side elevation of a machine in accordance with the present invention with parts broken away to show internal structure;

FIG. 5 is a vertical section on an enlarged scale taken on line 5—5 of FIG. 1 with parts shown in side elevation;

FIG. 6 is a fragmentary vertical elevation of the saw chain holder partly in section, taken on the line 6—6 of FIG. 3 with three links only of saw chain shown in elevation on the holder, also showing a portion of a grinding wheel in section and a portion of a stop pawl for the chain in elevation;

FIG. 7 is a partial rear elevation of the motor and grinding wheel of the machine on a reduced scale, showing the wheel dressing structure in rear elevation;

FIG. 8 is a fragmentary section on an enlarged scale taken on the line 8—8 of FIG. 7; and FIG. 9 is a fragmentary section taken on the line 9—9 of FIG. 2, showing a pivoted slide member in elevation except for portions broken away to show the pivot structure.

DESCRIPTION OF THE PREFERRED EMBODIMENT

Figure 2:
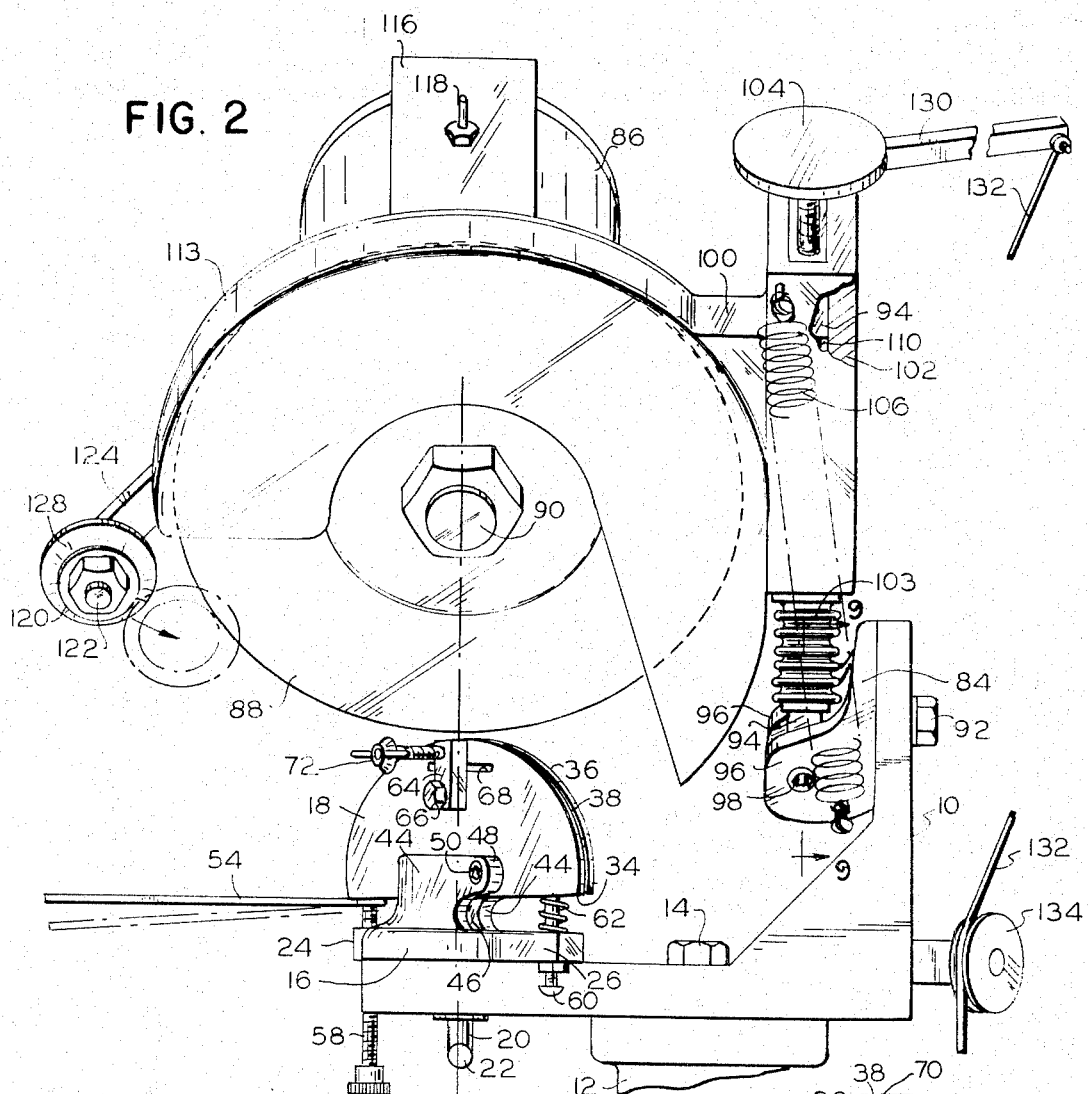
FIG. 2 is a front elevation of a machine of FIG. 1 also with parts broken away.

The preferred embodiment includes an L-shaped frame member 10 having a horizontal leg rigidly secured to the top of a support column 12 by a volt 14, it being understood that the lower end of the support column 12 has an enlarged base, not shown, for supporting the column in a vertical position.

A support member 16 for a saw chain holder 18 is positioned upon the upper surface of the horizontal leg of the frame member 10. The support member 16 has a round base held in position on the frame 10 by a clamping bolt 20 extending vertically upwardly through a bore in the frame member into threaded engagement with the base of the support. The clamping bolt has a handle portion 22 below the frame member 10 enabling loosening such bolt so that the support member 16 can be pivoted about the vertical axis of the clamping bolt, and held in adjusted position by tightening the clamping bolt.

The support member 16 has integral bar elements 24 and 26 projecting diametrically from opposite sides of its base. Adjustable stops in the form of bolts 28 and 30 screw-threaded through upwardly extending bosses 32 on the upper surface of the frame member 10 are positioned to be engaged by the bar members 24 and 26. Adjustment of the stop bolts 28 and 30 determines two definite angular positions about a vertical axis between which the support member 16 can be rapidly moved and locked in position be the locking bolt 20.

The saw chain holder 18 is a plate member having its faces in parallel vertical planes and having a straight lower edge 34 and a convex arcuate upper edge 36 provided with a slot 38 for receiving the drive lugs 40 of a chain having a cutter link provided with a chipper cutter element 41 and a depth gauge 42, as shown in FIG. 6.

Figure 3:
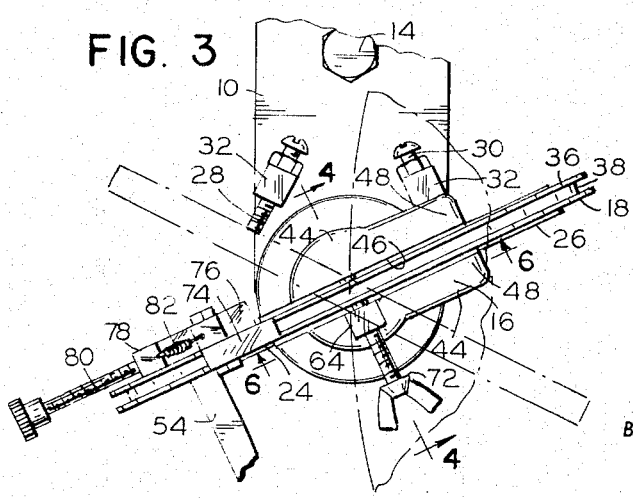
FIG. 3 is a partial plan view on an enlarged scale of the saw chain holder and its mounting.

As shown in FIGS. 1, 2 and 3, the support member 16 for the saw chain holder 18 has two similar support elements 44 spaced from each other to provide a slot 46 receiving the lower portion of the saw chain holder 18 and spaced from the sides of this holder. The slot 46 extends diametrically across the top of the support member 16 in alignment with the bar elements 24 and 26 on the support member.

The support elements 44 each has a portion 48 projecting from one of its sides and spaced from each other to form a continuation of the slot 46. The saw chain holder 18 is mounted on pivot members 50, one of which is shown in FIG. 1 and 2, screw-threaded through the positions 48 into sockets 52 in the holder 18, one of the sockets 52 being shown in FIG. 6. This structure supports the saw chain holder 18 for pivotal movement about a horizontal axis spaced horizontally from the vertical pivot axis of the support 16 provided by the clamping bolt 20.

A lever 54 has a socket 56 in one of its ends receiving the threaded end of a vertically extending bolt 58, as shown most clearly in FIG. 5. The bolt 58 extends vertically through the bar 24 on the support member in screw-threaded engagement with the bar and holds the lever 54 against the lower edge of one end of the saw chain holder 18, as shown most clearly in FIGS. 1 and 5.

A stop screw 60 extends in screw-threaded engagement through the bar 26 in position to engage the lower edge of the other end of the saw chain carrier and a compression spring 62 surrounds the screw to pivot the saw chain holder 18 about the pivot members 50 in a counterclockwise direction in FIG. 1 into engagement with the lever 54. It will be apparent that the manual movement of the other end of the lever 54 either upwardly or downwardly from its position shown in full lines in FIG. 1, will pivot the saw chain holder 18 clockwise about the pivot members 50 against the action of the spring 62 to a definite position determined by the adjustment of the stop screw 60.

Figure 4:
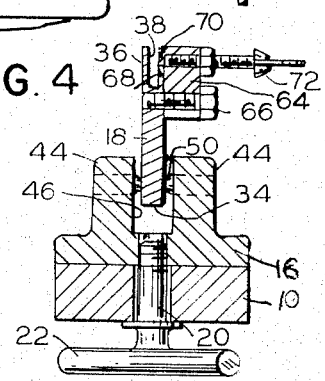
FIG. 4 is a vertical section taken on the line 4—4 of FIG. 3 with parts shown in side elevation.

The saw chain holder 18, as most clearly shown in FIGS. 1 and 4, has provision for adjusting the width of the slot 38 receiving the drive lugs 40 of the saw chain, such as shown in FIG. 6. This adjusting mechanism is shown in FIGS. 1 and 4, and including a vertically extending block 64 having its upper end adjacent the central uppermost portion of the upper edge 36 of the saw chain holder 18 and its lower end secured to the vertical front face of the holder by a bolt 66 extending through the block 64 into screw-threaded engagement with the holder 18. The holder has a horizontal slot 68 extending from such front face of the holder 18 into the slot 38 in such a holder to provide a resilient portion 70 movable inwardly of the slot 38 to decrease the width of this slot. The inner end of an adjustable thumb screw 72 screw-threaded through the block 64 engages the portion 70 to adjust the width of the slot 38 so as to snugly engage the driving lugs of the saw chain with a sliding fit and at a position immediately adjacent the grinding position of a cutter element on the saw chain holder.

A saw chain holding pawl 74, omitted from FIG. 2 for clarity but shown in FIGS. 1, 3 and 6, has one end provided to the upper end of a pawl supporting lever 76 having its lower end pivoted to the rear face of the saw chain holder 18. A vertical extending block 78 has its lower end secured to such face of the saw chain holder 18. A horizontally extending adjusting screw 80 is threaded through the upper end of the block 78 and has its threaded end in engagement with the midportion of the pawl lever 76. A tension spring 82 connected between the upper end of the lever 76 and the upper end of the block 78 urges the upper end of such lever to the left in FIG. 1 against the threaded end of the adjusting screw 80. The adjusting screw 80 thus adjusts the horizontal position of the pawl 74 along the upper edge of the saw chain holder 18 and as described below, adjustably holds the cutter element against rearward movement on the holder.

As shown in FIG. 2, a support member 84, forming part of a supporting structure for an electric motor 86 and for a disc shaped grinding wheel 88 mounted on the shaft 90 of the motor, is secured to an inner face of an upwardly extending arm of the L-shaped frame member 10 by a bolt 92 extending horizontally through the frame member into threaded engagement with the support member 84. The grinding wheel 88 is positioned with its faces inclined downwardly and toward the left of the machine as shown in FIGS. 1, and its angle of inclination is adjustable by loosening the bolt 92 shown in FIG. 2 and in dotted line in FIG. 1, pivoting the support member 84 about the bolt 92 to a desired position and again tightening the bolt 92. The wheel is shown in the grinding position in FIG. 1 and the bolt 92 shown in dotted line in FIG. 1 has its horizontal axis tangent to the grinding edge on the wheel so that adjusting the angle of inclination of the wheel does not move the grinding edge of the wheel from the desired grinding position.

The support structure for the motor 86 and grinding wheel 88 also includes a rectangular upwardly extending slide member 94 shown in FIGS. 1, 2 and 9. The slide member has its lower end pivotally mounted, as shown in FIG. 9, between spaced projections 96 on the support member 84 by pivot members in the form of pointed screw-threaded members 98 threaded through the projections 96 and received in sockets in the slide member 94. This pivot structure also illustrates the type of pivot structure having pivot members 50 for pivotally mounting the saw chain holder 18 shown in FIGS. 1 and 2 on the support member 16.

A carrier 100 shown in FIGS. 1 and 2 for the motor 86 has a sliding portion 102 in the form of a casing surrounding and fitting the upper end of the slide member 94 for sliding movement of the carrier 100 on the slide member 94. An adjusting screw 104 threaded through the top of the sliding portion 102 engages the top of the slide member 94 as shown in FIG. 1, so that the motor carrier 100 can be moved upwardly on the slide member by turning the screw 104. A pair of tension springs 106, one on each side of the sliding portion 102, extend between the upper part of such sliding member and the support member 84 to hold the sliding portion 102 of the motor carrier 100 in a downward position with the lower end of the screw 104 in engagement with the top of the slide member 94. A flexible boot 103 extends between the lower portion of the slide member 94 and the sliding portion 102 of the motor carrier 100 to keep foreign material out of the sliding portion 102.

The axis of the motor shaft 90 is parallel to the axis of pivotal movement of the slide member 94 on pivot members 98 so that such pivotal movement moves the grinding wheel 88 parallel to its faces. The guiding surfaces 108 of the slide member 94 are perpendicular to the pivotal axis of the slide member as shown in FIG. 9, and are also parallel to the faces of the grindwheel 88 so that sliding movement of the sliding portion 102 of the motor carrier 100 along the slide member 94 also moves the grinding wheel 88 parallel to its faces.

In the grinding position of the grinding wheel shown in FIGS. 1 and 2, the guiding faces 110 on the slide member 94 for the sliding portion 102 of the motor carrier 100 are in a vertical plane parallel to the vertical plane through the axis of the motor shaft 90 and the vertical pivotal axis of the support member 16 for the saw chain holder 18. The springs 106 urge the sliding portion 102 of the motor carrier 100 and the slide member 94 in a counterclockwise direction in FIG. 2 about the pivot members 98.

An adjustable stop bolt 112 shown in FIG. 9 and screw-threaded through the slide member 94 has an end portion, not shown, which engages the body portion of the support member 84. This stop bolt 112 is adjusted in the slide member 94 to stop the counterclockwise movement of the slide member 94 and motor carrier 100 supported on the slide member in a position in which the guiding faces 110 of the slide member 94 are in a vertical plane. In this position of the slide member 94, the axis of the motor shaft 90 is in the vertical plane through the vertical pivotal axis of adjustment of the saw chain holder 18. This means that adjustment of the position of the grinding wheel 88 by the adjusting screw 104 to compensate for wear of the grinding edge of the wheel maintains the wheel centered over the saw chain holder 18 at all times.

The motor carrier 100 includes a wheel guard portion 113 integral with the sliding portion 102. The wheel guard portion has a back plate 114 shown in FIG. 7, and one end of the frame of the motor 86 is secured to such plate. An electric switch is housed in a box 116 for controlling the motor. The box 116 is also secured to the back plate 114 and has an operating lever 118 having an off position and positions for forward and reverse operations of the motor.

A wheel dressing device shown in FIGS. 2, 7 and 8 includes a dressing wheel 120 mounted for rotation about a stub shaft 122 secured in one end of an arm 124. The arm 124 has its midportion pivoted at 126 on the back plate 114 of the guard portion 113 of the motor carrier 110. The dressing wheel 120 has an edge contour 128 which is complementary to the desired rounded edge of the wheel 88 as is apparent from FIG. 8.

The axis of the shaft 122 is parallel to the axis of the motor and wheel shaft 90. The axis of the pivot 126 is also parallel to the axis of the shaft 90 and the dressing wheel 120 so that the faces of this wheel are parallel to the faces of the grinding wheel 88. The dressing wheel 120 is aligned with the grinding wheel so that it can be moved about the pivot 126 into and out of the edgewise engagement with the grinding wheel 88 illustrated in FIG. 8.

The dressing wheel is made of much harder and coarser grained abrasive material than the abrasive material of the grinding wheel 88. Its abrasive is bonded so that pressing the dressing wheel lightly against the edge of the grinding wheel while the grinding wheel is being rapidly rotated by the motor quickly produces the required contour of the edges of the grinding wheel with substantially no wear of the edge of the dressing wheel.

The springs 106 normally hold the motor carrier structure 100 and therefor the grinding wheel 88 in the counterclockwise grinding position shown in FIGS. 1 and 2. As discussed above, this holds the lowermost edge of the grinding wheel 88 in the position shown in FIG. 6 between the cutter element 41 and depth gauge 42 of any chipper saw chain on the holder 18. This prevents movement of the saw chain forwardly on the holder 18 to bring another cutter link into grinding position on the carrier, and also prevents installations on or removal of a saw chain from such holder. In order to pivot the grinding wheel out of the way, an arm 130 shown in FIGS. 1 and 2 is secured to the top of the sliding portion 102 of the motor carrier 100 so as to extend outwardly from the right side of the machine. A rope 132 is attached to the outer end of the arm 130 and is trained over a pulley 134 journaled on the frame 10 of the machine so as to extend downwardly substantially parallel to the support column 12 of the machine. A foot pedal, not shown, is pivoted on the base of the column 12 and is employed to exert tension on the rope 132 when the pedal is depressed to pivot the motor carrier 100 and grinding wheel 88 about the axis of the pivot members 98. The wheel 88 is thereby moved in a direction parallel to the faces of the wheel 88 upwardly and to the right in FIG. 2. Release of the tension on the rope 132 allows the spring 106 to return the grinding wheel to grinding position.

The structure described above provides a number of adjustments. Thus the inclination of the grinding wheel 88 relative to the frame can be adjusted by pivoting the support member 84 shown in FIGS. 1 and 2 about its clamping bolt 92. The axial position of the grinding wheel relative to the frame can be adjusted by axially adjusting the pivot members 98, shown in FIGS. 2 and 9. The position of the grinding wheel laterally of the machine to center it above the saw chain holder 18 can be adjusted by axially adjusting the stop bolt 112 shown in FIG. 9. The lateral position of the saw chain holder 18 to center the slot 38 in its upper edge can be adjusted by axially adjusting the pivot members 50, shown in FIGS. 1 and 4. The angular positions of the saw chain holder 18 for grinding left and right cutter elements can be adjusted by the stop screws 28 and 30, shown in FIG. 3.

The above adjustments are, in general, factory adjustments and need not be changed for chipper saw chains of different sizes or of different shape. For different uses of the same chipper chain, it may, however, be desirable to change the angular positions of the saw chain holder 18 by adjusting the stop screws 28 and 30 and also change the angle of inclination of the wheel.

Different size chipper saw chains have drive lugs 40 shown in FIG. 6 of different thickness and such thicknesses vary throughout a range which is greater than the range of adjustment of the width of the slot 38 in the saw chain holder by the thumb screw 72. A series of interchangeable saw chain holders 18 having different widths of the slot 38 can be furnished, preferably with each installed in a support member 16, so as to enable quick changing of the saw chain holder by merely removing the clamp bolt 20 and reinstalling it in the replacing support member 16.

In operation the slide member 94 and carrier 100 are pivoted about the axis of the pivot members 98 by the rope 132 to lift the wheel 88 away from the grinding area. A chipper saw chain is installed on the holder 18 with the cutter elements facing toward the right in FIGS. 1 and 6, and the pawl 74 behind and in contact with a cutter element 41. The position of the pawl 74 is adjusted by the screw 80 to align the space between such cutter element and the depth gauge 42 with the path of movement of the grinding wheel 88 parallel to its faces. Tension on the rope 132 is then released to cause the edge of the grinding wheel to enter such space between a cutter element and depth gauge.

The cutter element selected for adjustment of the machine for grinding a saw chain will ordinarily be the one with the shortest length longitudinally of the chain and the positions of the grinding wheel 88 and the pawl 76 are adjusted by the adjusting screws 104 and 80, respectively, until pivotal movement of the saw chain holder 18 about the axis of the pivot elements 50 into engagement with the stop screw 60 causes correct contact between the lowermost portion of the edge of the grinding wheel and the areas to be ground on the cutter element. Adjustment of the stop screw 60 for the saw chain holder of the lever adjusting bolt 58 is rarely necessary but, if necessary, adjustment of these elements can be made. Adjustment of the stop screws 28 and 30 or the angle of inclination of the wheel 88 is required only, if the intended use of the saw chain requires different angular settings of the saw chain holder amd grinding wheel in order to change the angle of grinding of the cutter elements for some special saw chain use.

The motor is then started in a selected direction and the cutter element ground by actuating the lever 54. The pivoting of the saw chain holder about the axis of the pivot members 50, i.e. about the center of the socket 52 in FIG. 6 spaced forwardly of the saw chain from the grinding area, causes movement of the cutter element into contact with the edge of the grinding wheel 88 in the direction of the arrow just above the cutter element 41 in such figure. The reaction due to grinding contact with the edge of the wheel is opposite to that of such arrow and tends to force the cutter link down against the upper edge 36 of the saw chain holder 18 and increase the accuracy of grinding.

Upon the completion of the grinding of such cutter element, the grinding wheel 88 is again moved away from the saw chain, the saw chain is manually moved forwardly under the pawl 74 until the next cutter element of the same hand passes under the pawl and the chain is then moved backwardly until stopped by the pawl 74 engaging behind such cutter link. The grinding wheel 88 is again allowed to return to grinding position and the lever 54 again actuated to pivot the saw chain holder. This is repeated until all of the cutter elements of the same hand are ground.

The saw chain holder is released and pivoted to and clamped in its alternative pivotal position for grinding cutter elements of the other hand. The motor is reversed and such cutter elements of the other hand then ground in the same manner.

When necessary the dressing wheel 120 is employed to dress the curved edge of the grinding wheel 88. Ordinarily one dressing of the grinding wheel will suffice for grinding several saw chains. This means that the wear on the edge of the grinding wheel during the grinding of one saw chain does not result in any significant change in the shape or degree of sharpening of the cutter elements of such chain.

I claim:

1. A machine for sharpening the cutter elements of a chipper saw chain, which comprises:
   a disc-shaped grinding wheel having a rounded grinding edge for sharpening said cutter elements;
   support means supporting said wheel for rotation about an inclined axis so that the faces of said wheel are inclined downwardly and toward one side of said machine;

saw chain holder means supported below said wheel and having means for supporting said chain for forward movement of said chain on said holder means;

said saw chain holder means being mounted for pivotal movement about a vertical axis to enable movement of said holder means between a position for grinding right cutter elements of said saw chain and a position for grinding left cutter elements of said saw chain and having means for holding a cutter link of said saw chain in an adjustable position on said holder for receiving the grinding edge of said wheel between the cutting element and the depth gauge of said cutter link when said holder is in either of said positions;

said support means having means for supporting said wheel with the lowermost edge portion of said wheel in grinding position between the cutter element and depth gauge of said cutter link and having pivot means positioned at the rear of said machine and spaced from the axis of said wheel a distance not substantially greater than the diameter of said wheel to provide for movement of the lowermost portion of said edge of said wheel out of the path of movement of said saw chain on said holder means;

means for moving said saw chain holder means and said wheel relative to one another to position said cutter element in grinding engagement with the grinding edges of said wheel when said lowermost portion of said edge of said wheel is in said grinding position, said vertical axis of said saw chain holder means extending through the area of said grinding engagement, and said axis of said wheel being in a vertical plane extending through said vertical axis when said lowermost portion of said edge of said wheel is in said grinding position, said support means having adjustment means for moving the axis of said wheel in a straight line in said vertical plane when said lowermost portion of said wheel is in said grinding position to adjust for wear of the edge of said wheel.

2. The machine of claim 1 in which:

said adjustment means includes slide means extending parallel to said vertical plane when said lower edge of said wheel is in said grinding position and also extending parallel to the faces of said wheel and means for adjusting said slide means to adjust for wear of the edge of said wheel.

3. The machine of claim 1 in which the axis of said pivot means for said support means is parallel to said axis of said wheel.

4. The machine of claim 3 in which said pivot means for said support means is carried by a support member which is pivotally adjustable about a horizontal axis intersecting said vertical axis of said holder means to provide for adjusting the angle of inclination of the faces of said wheel and tangent to the lowermost edge of said grinding wheel when the latter is in grinding position.

5. The machine of claim 4 in which:

said adjustment means includes slide means for sliding adjustment of said wheel in a direction perpendicular to said pivot means for said support means and also perpendicular to said horizontal axis when said lowermost portion of said edge of said wheel is in said grinding position.

6. The machine of claim 1 in which:

said saw chain holder means is also mounted for pivotal movement about a horizontal axis below said lowermost portion of said edge of said wheel to enable moving said cutter element into said grinding engagement.

7. The machine of claim 6 in which:

said horizontal axis is spaced from said vertical axis in a direction forwardly of said saw chain so that said moving of said cutter element into said grinding engagement includes upward movement in addition to forward movement of said cutter element.

8. The machine of claim 1 also includes:

dressing means for said edge of said wheel having a disc shaped dressing element and means for mounting said dressing element on said support means for said wheel for rotation of said dressing element about an axis parallel to the axis of rotation of said wheel;

said dressing element having an edge which is complementary to the desired rounded edge on said wheel;

said means for mounting said element enabling movement of said dressing element parallel to the faces of said dressing element to move said edge of said dressing element into dressing engagement with said edge of said wheel.

9. The machine of claim 8 in which:

said means for mounting said dressing element is pivotally mounted on said means for supporting said wheel for movement about an axis parallel to the axis of rotation of said wheel.

* * * * *

UNITED STATES PATENT OFFICE
CERTIFICATE OF CORRECTION

Patent No. 3,779,103     Dated December 18, 1973

Inventor(s) Elmer R. Silvey

It is certified that error appears in the above-identified patent and that said Letters Patent are hereby corrected as shown below:

Col. 3, line 57 "a chain" should be --a saw chain--

Col. 4, line 23, "screw" should be --stop screw--

Col. 4, lines 56 and 57 "provided" should be --pivoted--

Col. 6, line 38 "motor carrier 110" should be --motor carrier 100--

Col. 7, line 19 "spring 106" should be --springs 106--

Col. 8, line 14 "of the lever" should be --or the lever--

Col. 9, line 44 "said wheel" should be --said edge of said wheel--

Col. 10, line 31 "claim 1 also" should be --claim 1 which also--

Signed and sealed this 14th day of May 1974.

(SEAL)
Attest:

EDWARD M. FLETCHER, JR.
Attesting Officer

C. MARSHALL DANN
Commissioner of Patents